United States Patent [19]
Dwyer, Jr.

[11] 3,933,177
[45] Jan. 20, 1976

[54] MANUALLY CONTROLLED AIR INFLATOR ADAPTOR

[75] Inventor: John Robert Dwyer, Jr., Excelsior, Minn.

[73] Assignee: The Black and Decker Manufacturing Company, Towson, Md.

[22] Filed: Oct. 23, 1973

[21] Appl. No.: 408,923

[52] U.S. Cl. ............ 137/608; 15/330; 220/DIG. 14; 137/223; 128/276
[51] Int. Cl.² ........................................ F16K 41/02
[58] Field of Search.................. 137/223, 231, 608; 251/368; 15/405, 330; 220/DIG. 14; 128/276, 274

[56] References Cited
UNITED STATES PATENTS

| 1,997,955 | 4/1935 | Weaver | 137/223 X |
| 2,716,998 | 9/1955 | Kuasko | 137/231 |
| 2,869,573 | 1/1959 | Stafford | 137/223 |
| 2,873,782 | 2/1959 | Gunn | 220/DIG. 14 |
| 3,319,628 | 5/1967 | Halligan | 128/297 X |
| 3,368,302 | 2/1968 | Martino | 137/223 X |
| 3,525,118 | 8/1970 | Viollet | 15/330 |
| 3,540,472 | 11/1970 | Brady | 251/368 X |
| 3,595,234 | 7/1971 | Jackson | 128/276 |
| 3,625,221 | 12/1971 | Corbett | 128/276 X |
| 3,713,443 | 1/1973 | Fertik | 128/276 |

Primary Examiner—Harold W. Weakley
Attorney, Agent, or Firm—Joseph R. Slotnik; Edward D. Murphy; Leonard Bloom

[57] ABSTRACT

A manually controlled hand-held air inflator adaptor for use with an air compressor is disclosed which is suitable for molding as a single element and which includes an inlet port and passageway, and discharge and bleed ports and passageways in fluid-flow communication with said inlet port and passageway. The discharge port includes means for attachment to an inflator stem or the like, or the adaptor may be used without the inflator stem, such as for cleaning, etc.

1 Claim, 4 Drawing Figures

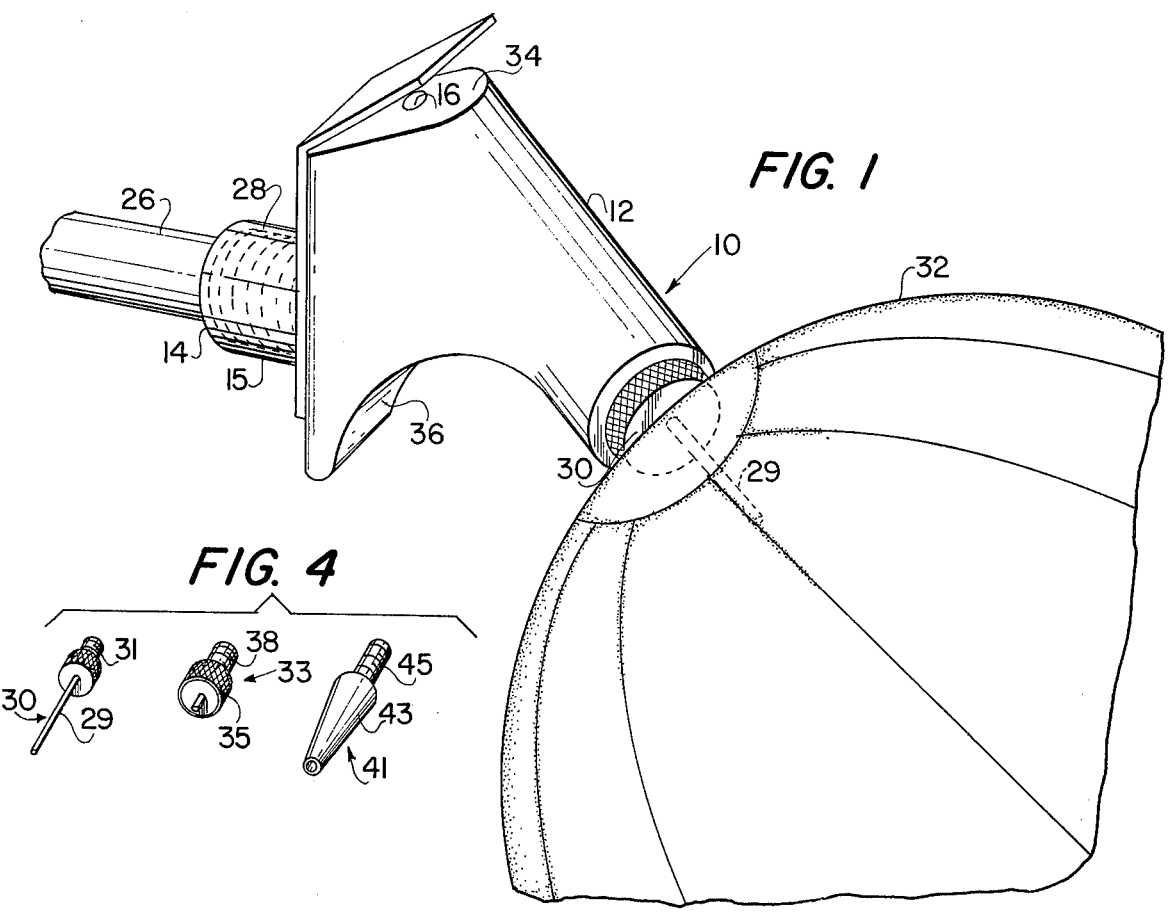
FIG. 1
FIG. 4
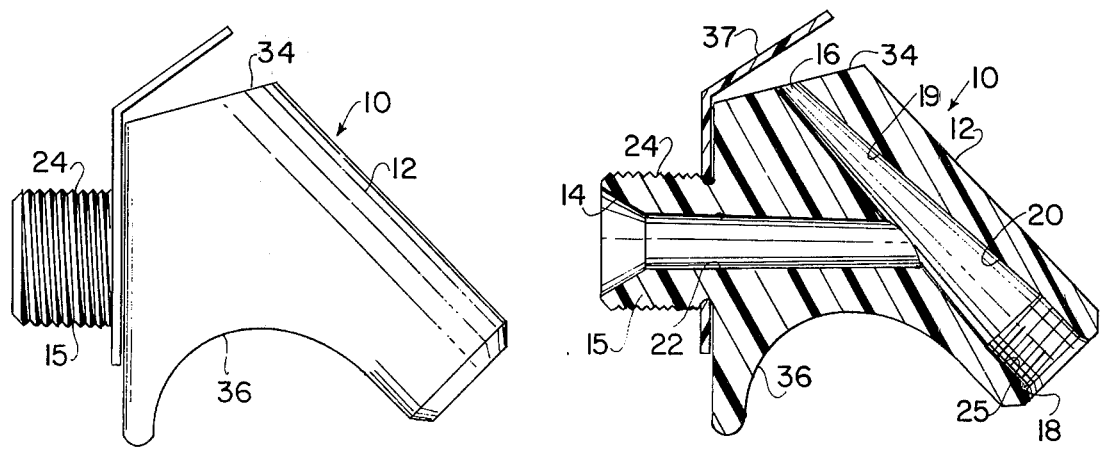
FIG. 2
FIG. 3

MANUALLY CONTROLLED AIR INFLATOR ADAPTOR

BACKGROUND OF THE INVENTION

This invention relates to devices for inflating air inflatable objects and, more particularly, to a manually controlled hand-held air inflator adaptor for use with air compressors.

Equipment to inflate air inflatable objects, while existing for many years, has become more important within the past several years, especially for the consumer. For example, athletic devices such as basketballs, footballs, soccer balls, etc.; bicycle tires; air mattresses, toys and many other similar inflatable objects, are purchased in a deflated state and require inflation by the consumer. It is also becoming common for consumers to have sources of pressurized air, such as compressors. The adaptor of this invention is constructed for use with such a source of pressurized air for the purpose of inflating these typical consumer oriented products safely and with minimal risk of over inflation even by inexperienced users. In addition, the adaptor of this invention is constructed for such general use as a blow gun in maintenance, cleaning and dusting work. It is desirable that the adaptor be safe, inexpensive and easy to use.

Accordingly, it is an object of this invention to provide an air inflator adaptor of the character described which is inexpensive to manufacture and which may be held and safely controlled and operated with one hand.

Additional objects and advantages of the invention will be set forth in part in the description which follows, and in part will be obvious from the description, or may be learned by the practice of the invention. The objects and advantages of the invention may be realized and obtained by means of the instrumentalities and combinations particularly pointed out in the appended claims.

BRIEF DESCRIPTION

To achieve the foregoing objects and in accordance with the purpose of the invention, as embodied and broadly described herein, the manually controlled air inflator adaptor of this invention comprises a body having an inlet port, a discharge port and a bleed port, passageway means providing fluid-flow communication between the inlet port and each of the bleed port and discharge port.

Preferably the adaptor includes means at the discharge port to releasably receive a stem, or pin, for insertion in an inflatable object, the pin having a passageway in fluid-flow communication with the discharge passageway when the pin is received by the releasable means. Furthermore, it is preferred that the inlet port includes means for releasably receiving means connected to a source of pressurized fluid.

The bleed port is normally opened and prevents delivery of more than nominal pressure to the discharge port. However, when the bleed port is covered, requiring a deliberate but simple manual action, substantially all the pressurized air entering the inlet port is delivered to the discharge port and is available for work.

It is also preferred that the adaptor body be a one-piece molded plastic, e.g. thermoplastic, housing with tapered passageways to facilitate molding. However, it will be appreciated that this body can be cast of metal or can be constructed of more than one piece or with other than tapered passageways.

The invention consists in the novel parts, constructions, arrangements, combinations and improvements shown and described. The accompanying drawings, which are incorporated in and constitute a part of the specification illustrate one embodiment of the invention and, together with the description, serve to explain the principles of the invention.

BRIEF DESCRIPTION OF THE DRAWINGS

Of the drawings:

FIG. 1 is a perspective view of a manually controlled air inflator adaptor formed in accordance with this invention and shown in its operation position;

FIG. 2 is a side elevational view of the adaptor of FIG. 1;

FIG. 3 is a sectional view taken along the line 3—3 of FIG. 2; and

FIG. 4 is a view showing air inflators adapted for use with the adaptor of the present invention.

DESCRIPTION OF THE PREFERRED EMBODIMENT OF THE INVENTION

Reference will now be made in detail to the present preferred embodiment of the invention, an example of which is illustrated in the accompanying drawings.

In accordance with the invention, a manually controlled hand-held inflator adaptor is provided which is suitable for use in inflating many different types of air inflatable devices. As here embodied, the adaptor, generally indicated at 10, comprises a body 12 having an inlet port 14 formed in an extension 15, a bleed port 16 and a discharge port 18.

The adaptor body 12 also includes passageways providing fluid-flow communication between the inlet port 14 and the bleed and discharge ports 16, 18. Thus, an inlet passageway 22 formed by a tapered bore extending from inlet port 14, intersects another tapered bore forming a bleed passageway 19 and a discharge passageway 20. As shown, the bleed passageway 19 terminates in bleed port 16 while discharge passageway terminates in discharge port 18.

The extension 15 is formed with means, such as external threads 24, to permit releasable attachment to a source of pressurized fluid. FIG. 1 illustrates a pressurized fluid line 26 having a female coupling 28 on its end for attachment to the adaptor 10. The pressurized fluid line 26 is connected at its other end to any suitable source of pressurized fluid, such as an air compressor (not shown).

The discharge port 18 is provided with means such as a threaded socket 25, to releasably receive an inflator which communicates with the interior of the object to be inflated. For inflating athletic balls such as basketballs, volley balls, soccer balls, etc. it is conventional to use an inflator such as shown at 30 in FIG. 4. This inflator 30 comprises a stem 29 having an enlarged, externally threaded end 31 and a passageway running therethrough. For tires, an inflator 33 (FIG. 4) generally includes a valved chuck 35 having a threaded end 38 and is cooperably engageable with a stem provided on the tires. With toys, an inflator 41 having a tapered stem 43 having a threaded end 45 may be used. In all cases, the threaded end of the inflator is fitted into the threaded socket 25 in the inflator adaptor 10, while the other end of the inflator is fitted into or onto the device to be inflated.

For purposes of implicity of description in the specification and claims the term "stem" is used in a general sense to encompass various devices which are used with inflatable objects to provide the fluid-flow connection between adaptor 10 and the interior of the inflatable object.

As here embodied, the inflator adaptor body 12 is formed of a single piece and designed to be easily molded of a suitable thermoplastic material such as Nylon. The body 12 is molded with a pistol grip shape to allow comfortable holding of the adaptor 10 in one hand in such a manner that the user's thumb may be easily placed adjacent a flat surface 34 immediately adjacent to the bleed port 16, while a curved recess 36 opposite the surface 34 is shaped to receive one or more of the user's fingers in comfortable fashion. To facilitate molding the entire adaptor body 12 as a single piece, the passageway 19, 20 and the passageway 22 are tapered as shown in FIG. 3 and are formed by cores in the molds which are easily pulled because of the taper.

The passageway 22 has a relatively small degree of taper, generally sufficient to enable pulling of the mold core during formation of the body 12. On the other hand, passageway 19, 20 may have a somewhat greater taper, with the smallest cross-section adjacent bleed port 16. With this construction, bleed port 16 can be manually covered and closed with little difficulty even when full air pressure is being supplied to the adaptor 10. However, bleed port 16 should have a sufficiently large cross-section to allow sufficient air bleed therethrough when the port is open, so that only nominal air pressure can be delivered through discharge port 18 when bleed port 16 is open. This serves to closely control delivery pressure through port 18 and thereby prevent dangerous over inflation of any device with which the present invention is used.

If desired, a flexible flap 37 constructed of, for example, Vinyl, is mounted on extension 15 and is disposed to be engaged by the user's thumb for covering bleed port 16.

In use, the adaptor 10 is quickly and easily attached to a source of pressurized fluid, such as an air compressor line 26, by threading the compressor coupling 28 onto threads 24. Depending upon the object to be inflated, the desired stem is releasably inserted in the discharge outlet 18, such as by threadably engaging it with the threaded socket 25. The adaptor 10 is now ready for use.

Assuming that an athletic ball 32 is being inflated, the stem 29 of inflator 30 is inserted into a self-sealing valve normally provided in the ball and the compressor is actuated. Air enters the adaptor inlet port 14 and passes through the passageway 22. If the air pressure within the ball 32 is greater than atmospheric pressure, the air will flow through the passageway 20 toward and out through the bleed port 16, provided nothing obstructs the bleed port 16. Little or no air will discharge through port 18. In order to inflate the ball, the user, exercising a deliberate act, places his thumb directly over the bleed port 16, or presses the flap 37 to cover port 16, if a flap is provided, thereby forcing the air to flow through the discharge port 18, the stem 30 and into the ball 32. By selectively covering, uncovering or partially covering the bleed port 16, the user can easily control the extent to which the ball 32 is inflated. As soon as the ball is fully inflated the user merely removes his thumb from the bleed port 16, and since the pressure within the ball is greater than atmospheric pressure, the air entering the passageway 22 will flow out through the bleed port 16. The adaptor 10 is then retracted from the ball effecting removal of the stem 29 from the self-sealing valve.

As can be seen from the structure illustrated in the drawing and the above description, this invention provides a manually controlled hand-held inflator adaptor which is inexpensive to manufacture, easy to use and which is small and comfortably held in one hand. Furthermore, this adaptor prevents overinflation of toys, balls, etc., especially by children, in that it requires a deliberate action, i.e., covering a bleed hole, in order for inflation to occur. This renders the device considerably safe in use and renders it inoperative when the user's hand is not in place thereon.

What is claimed is:

1. A manual, hand-held air inflator adaptor comprising a one-piece molded plastic body having an inlet port, a bleed port, and a discharge port; a flat external surface encompassing said bleed port; said inlet port and said discharge port being substantially equal in cross sectional area, and said bleed port being substantially smaller than said discharge port in cross sectional area; a first passageway extending longitudinally through said body from said bleed port to said discharge port, said first passageway being tapered so as to form a smooth-walled surface increasing in cross sectional size from said bleed port to said discharge port to cause the total force exerted by compressed air within said body to be substantially larger at said discharge port than it is at said bleed port; second passageway means extending internally of said body from said inlet port to said first passageway means to allow a normal flow of air from said inlet port into said second passageway and through said discharge port when the pressure externally of said discharge port is lower than that at said inlet port; said flexible closure means mounted externally on said body, said closure means including a planar sealing portion positioned adjacent said bleed port for pivotal movement by an operator into sealing engagement with said flat surface about said bleed port to cause the full pressure of compressed air at said inlet port to be applied to said discharge port.

* * * * *